Figure 1:
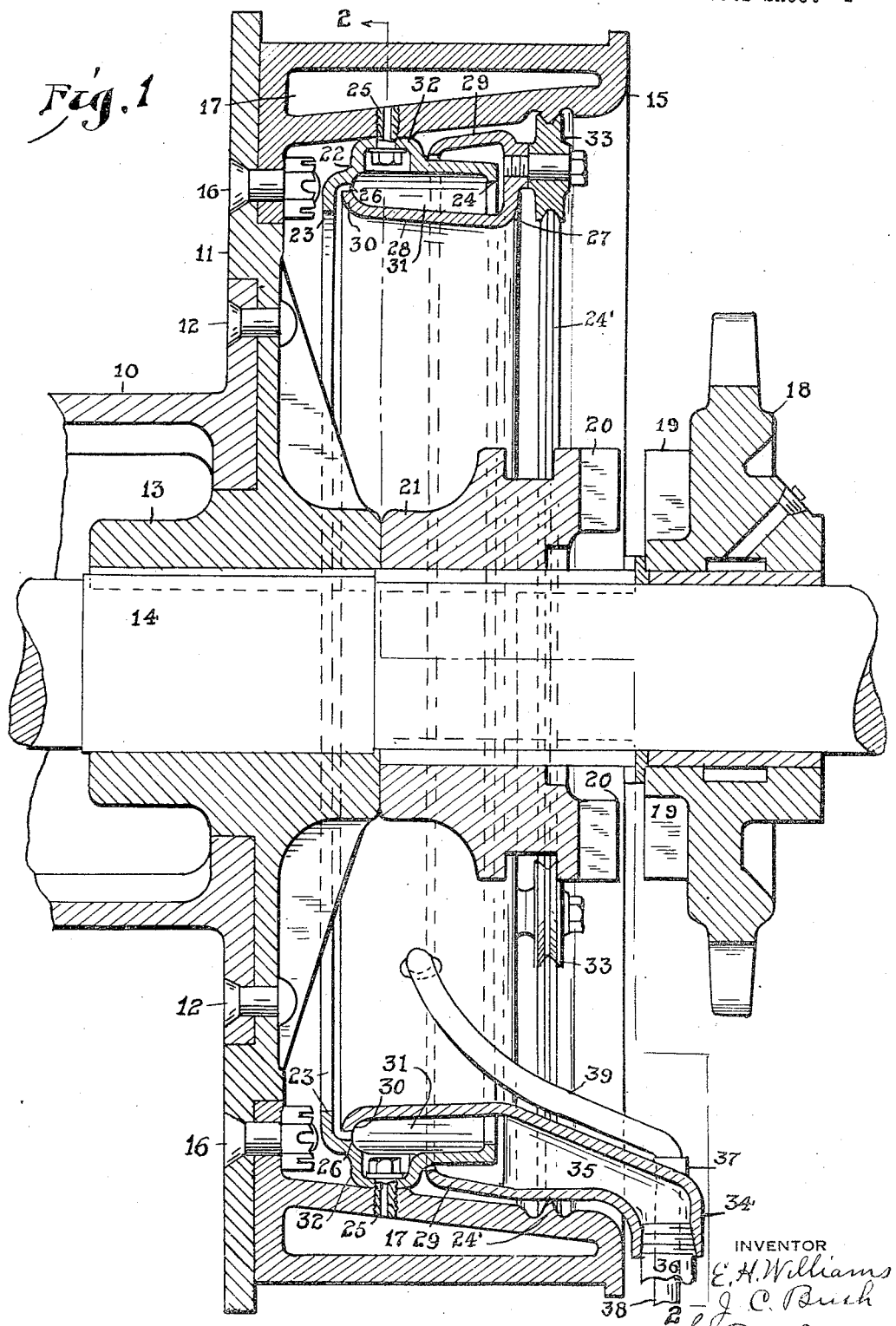

Jan. 1, 1929.

E. H. WILLIAMS ET AL 1,697,825

WATER COOLED BRAKE RIM

Filed June 18, 1928     2 Sheets-Sheet 1

INVENTOR
E. H. Williams
J. C. Bush
by F. N. Barber
Attorney

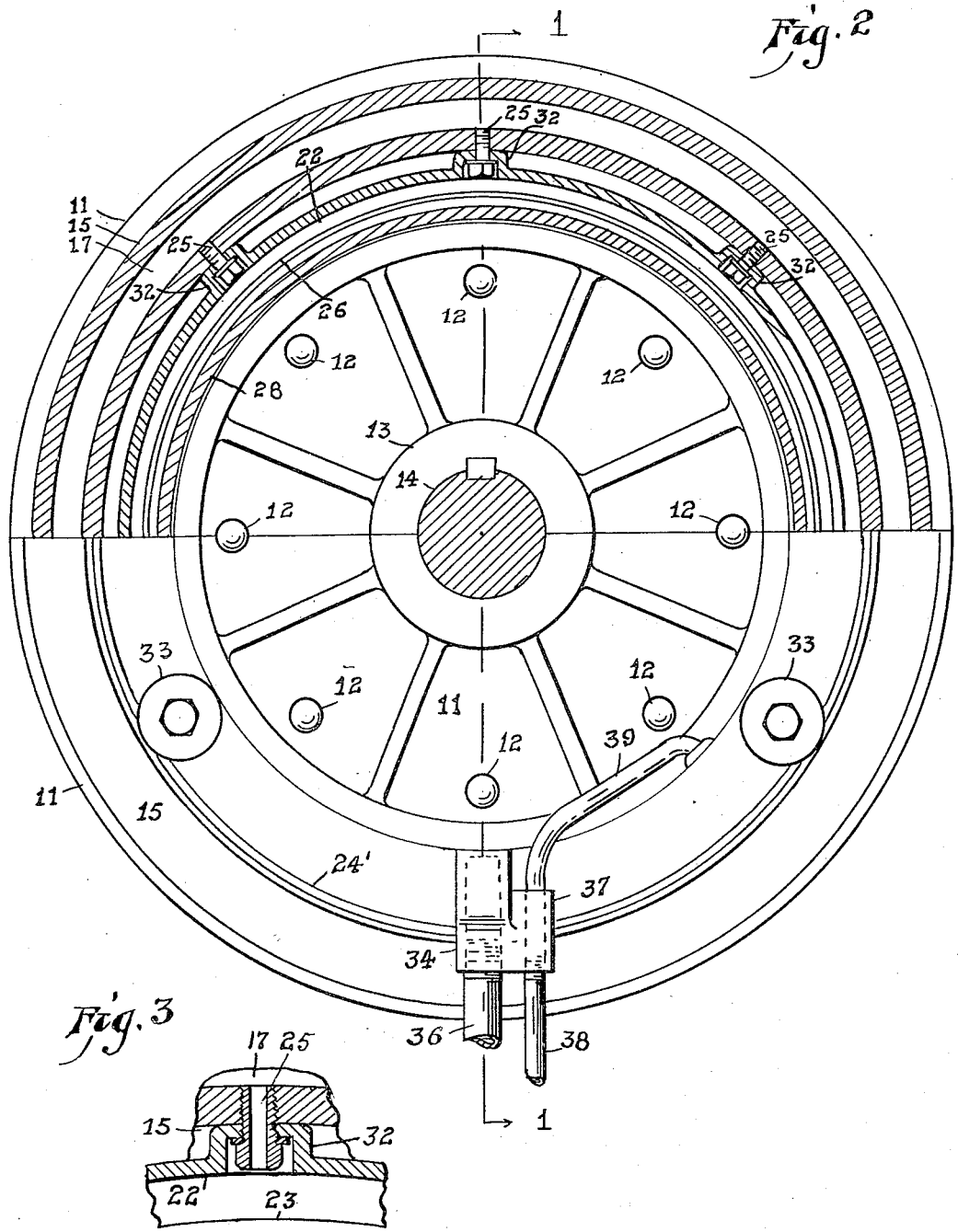

Patented Jan. 1, 1929.

1,697,825

UNITED STATES PATENT OFFICE.

EDWARD H. WILLIAMS, OF CRAFTON, AND JOHN C. BUSH, OF WOODLAWN, PENNSYLVANIA, ASSIGNORS TO THE NATIONAL SUPPLY COMPANY, OF TOLEDO, OHIO, A CORPORATION OF OHIO.

WATER-COOLED BRAKE RIM.

Application filed June 18, 1928. Serial No. 286,364.

Our invention relates to water cooled brake rims designed particularly for draw works, but capable of use with other kinds of machinery.

The object of this invention is to provide a device of the class just mentioned with a water circulatory system wherein no packing or water-tight pressure connection is required between the rotating hollow water cooled brake element and the stationary element which conducts cooling water to the rotary element and conducts the heated water away therefrom. Other objects appear hereinafter.

Referring to the accompanying drawings, Fig. 1 is a central section of a brake drum or rim equipped with our invention, the section being taken on the line 1—1 on Fig. 2; Fig. 2, a section on the line 2—2 on Fig. 1; and Fig. 3, a side view of a fragment of the rim with parts in section.

On the drawings, 10 designates a hoist drum having one end supported by and secured to the drum-flange 11 by any suitable means, as the rivets 12. The flange has a hub 13 keyed on the shaft 14. The brake rim or drum 15 is secured to the flange by the bolts 16 and has the annular water passage 17.

18 is a sprocket wheel running loose on the shaft 14 and has the dental clutch members 19 adapted to be interlocked with the dental clutch members 20 on the clutch body 21 slidable on the shaft but rotatable therewith.

A ring 22 having lateral flanges or lips 23 and 24 projecting toward the shaft 14 forms an annular trough or channel which is secured to the inner face of the rim 15 by means of the hollow bolts 25. The flange 23 is wider than the flange 24, that is, it extends farther toward the shaft. It has the annular shoulder 26 between its edge and the base of the ring.

27 is an annular water-retainer having the annular flanges or members 28 and 29 lying on opposite sides of the ring 22. The part of the retainer which supports the flanges 28 and 29 stands vertically opposite the outer edge of the ring 22, the flange 28 extending inwardly within the ring 22 so that its outwardly extending annular flange 30 lies within the spaces enclosed by the shoulder 26, but spaced from the shoulder and the flange 23. There is formed between the ring 22 and the member 28 an annular passage 31 with its lateral portions open, as the flange 24 is spaced from the member 28.

The flange 29 extends inwardly between the rim 15 and the ring 22 and terminates near to the outwardly extending annular bosses 32 which rest against the inner face of the rim and receive the heads of the bolts 25. The members 28 and 29 converge toward the drum flange 11.

The retainer 27 carries the grooved rollers 33 which run on the annular rib or track 24' on the inner face of the rim 15.

The lower portion of the member 27 has the connection 34 having the passage 35 which leads inwardly to the passage 31, its outer end having connected thereto the discharge pipe 36 leading to any suitable container. The connection 34 has the portion 37 which receives at its outer end the inlet pipe 38 and at its inner end the pipe 39 which conveys water into the passage 31.

The member 27 is prevented from rotating by means of the water pipes 36 and 38.

The operation is as follows: The sprocket wheel 18 being driven by any suitable means, the clutch body 21 is moved to the right to make the dental members 20 interlock with the dental members 19, whereupon the shaft 14, the hub 13, the flange 11, the drum 10, the rim 15 and the ring 22 are caused to rotate. Water is fed with a predetermined force into the passage 31 through the pipe 38, the connection portion 37 and the pipe 39. Centrifugal force causes the water in the passage 31 to be forced outwardly through the hollow bolts 25 and into the rim passage 17. The amount of water forced into the passage 17 for cooling the rim at any one operation depends upon the rate of water flow into the passage 17 and upon the duration of time of the operation. The rate of flow can be varied as by selecting bolts 25 with different sizes of passages. In case the time and rate of flow is sufficient to fill the passage 17 in any one run or operation, the circulating water will then overflow the lip or flange 24 and escape by gravity through the outlet 35 and pipe 36.

When the rim comes to a stop the water in the passage 17 will immediately escape in the passage 31 through all the bolts and be drained off through the pipe 36 down to the level of the lowest bolt outlet. On the next operation of the drum 10, water will again be supplied to the passage 17, again to be drained as before when the drum stops.

The grooved wheels 33 support the retainer 27 and keep it centered and prevent its movement longitudinally of the shaft.

We claim—

1. In a means for cooling rotary devices, a circular hollow rotatable rim, an annular channel arranged at the inner circumference of the rim and open toward the axis of rotation of the rim and having travel with the rim, means for supplying a cooling fluid to the channel, and means whereby cooling fluid in the channel is conveyed into the hollow of the rim by centrifugal force when the rim is rotated.

2. In a means for cooling rotary devices, a circular hollow rotatable rim, an annular channel arranged at the inner circumference of the rim and open toward the axis of rotation of the rim and having travel with the rim, means for supplying a cooling fluid to the channel, and removable conduits of selected size between the channel and the hollow of the rim whereby cooling fluid may be conveyed from the channel into the hollow of the rim by centrifugal force when the rim is rotated.

3. In a means for cooling rotary devices, a circular hollow rotatable rim, an annular channel arranged at the inner circumference of the rim and open toward the axis of rotation of the rim, hollow bolts connecting the rim and the channel, and means for supplying a cooling fluid to the channel.

4. In a means for cooling rotary devices, a circular hollow rotatable rim, an annular channel arranged at the inner circumference of the rim and open toward the axis of rotation of the rim and having travel with the rim, means for supplying a cooling fluid to the channel, means whereby cooling fluid in the channel is conveyed into the hollow of the rim by centrifugal force when the rim is rotated, and a fixed outwardly facing annular channel within the first channel and having at its lower portion a waste outlet.

5. In a means for cooling rotary devices, a circular hollow rotatable rim, an annular channel arranged at the inner circumference of the rim and open toward the axis of rotation of the rim and having travel with the rim, means for supplying a cooling fluid to the channel, means whereby cooling fluid in the channel is conveyed into the hollow of the rim by centrifugal force when the rim is rotated, a fixed outwardly facing annular channel within the first channel and having at its lower portion a waste outlet, and an annular channel having an annular connection with the second channel opposite the outer edge of the first channel and overlying the outer face of the first channel, the third channel communicating with the said waste outlet.

6. In a means for cooling rotary devices, a circular hollow rotatable rim, a channel member rotatable with the rim and having at its edges flanges extending toward the axis of the rim, means for supplying the channel with a cooling liquid, and ported means for conveying said liquid by centrifugal force from the channel into the hollow in the rim, when the rim rotates, and from the said hollow back into the channel when the rim stops after rotation.

7. In a means for cooling rotary devices, a circular hollow rotatable rim, a channel member rotatable with the rim and having at its edges flanges extending toward the axis of the rim, means for supplying the channel with a cooling liquid, and ported means for conveying said liquid by centrifugal force from the channel into the hollow in the rim, when the rim rotates, from the said hollow back into the channel when the rim stops after rotation, and an annular retainer for the said fluid, the retainer having an annular base member at one edge of the channel member and also having two annular channel members one open outwardly and lying within the rim and opposed to the first channel member, and the other open inwardly and overlapping the outer face of the first channel member, and a waste conduit leading from the lower portion of the first channel, the flanges on the first channel member being at different distances from the axial center of the rim and the flange which is at the greater distance from said axis being between the said channel members on the retainer, whereby excess fluid supplied to the said hollow during the rotation of the rim and drained therefrom when the rotation ceases is drained into the waste conduit.

In testimony whereof we hereunto affix our signatures.

EDWARD H. WILLIAMS.
JOHN C. BUSH.